United States Patent
Veeraswamy et al.

(10) Patent No.: US 10,776,317 B1
(45) Date of Patent: Sep. 15, 2020

(54) METADATA ANALYTICS FOR ONLINE FRAGMENTATION DETECTION ON UNIX FILE SYSTEMS AND COMMON BLOCK FILE SYSTEMS

(71) Applicant: EMC Corporation, Hopkinton, MA (US)

(72) Inventors: Sairam Veeraswamy, Tamilnadu (IN); Assaf Natanzon, Tel Aviv (IL); Nir Goldschmidt, Herzelia (IL); Anat Parush Tzur, Be'er Sheva (IL); Ajay Potnis, Maharashtra (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 673 days.

(21) Appl. No.: 14/674,877

(22) Filed: Mar. 31, 2015

(51) Int. Cl.
*G06F 16/17* (2019.01)
*G06F 3/06* (2006.01)
*G06F 16/11* (2019.01)

(52) U.S. Cl.
CPC ........ *G06F 16/1727* (2019.01); *G06F 3/0604* (2013.01); *G06F 3/0667* (2013.01); *G06F 3/0673* (2013.01); *G06F 16/122* (2019.01)

(58) Field of Classification Search
None
See application file for complete search history.

(56) References Cited

U.S. PATENT DOCUMENTS

| | | | | |
|---|---|---|---|---|
| 5,088,058 A | * | 2/1992 | Salsburg | G06F 11/3447 700/30 |
| 5,963,982 A | * | 10/1999 | Goldman | G06F 12/023 707/999.202 |
| 6,356,915 B1 | * | 3/2002 | Chtchetkine | G06F 16/192 707/823 |
| 6,785,886 B1 | * | 8/2004 | Lim | G06F 9/45533 711/202 |
| 6,895,591 B1 | * | 5/2005 | Russ | G06F 16/10 719/332 |
| 7,409,522 B1 | * | 8/2008 | Fair | G06F 3/061 707/999.202 |

(Continued)

OTHER PUBLICATIONS

Garimella. "Understanding and exploiting snapshot technology for data protection, Part 1: Snapshot technology overview." Published Apr. 26, 2006. IBM developerWorks. URL: https://www.ibm.com/developerworks/tivoli/library/t-snaptsm1/index.html. Retrieved Jan. 2018.*

(Continued)

*Primary Examiner* — Neveen Abel Jalil
*Assistant Examiner* — Irene Baker
(74) *Attorney, Agent, or Firm* — Staniford Tomita LLP

(57) ABSTRACT

Embodiments are described for detecting a data organization issue in a storage system by analyzing static and dynamic layout characteristics for data stored in the storage system, workload characteristics for applications utilizing the data, virtualization effects of the storage system on the organization of the data, input/output characteristics of processes storing the data in the storage system, and cache usage characteristics of the data. For fragmentation issues, the system uses the analysis to provide defragmentation advisories to reduce fragmentation by at least one of: re-layout or re-tiering of the data in the data storage system, or cache memory reconfiguration.

16 Claims, 6 Drawing Sheets

(56) References Cited

U.S. PATENT DOCUMENTS

| | | | | |
|---|---|---|---|---|
| 7,725,506 B1* | 5/2010 | Stringham | G06F 17/30135 | 707/822 |
| 8,019,799 B1* | 9/2011 | Batterywala | G06F 16/10 | 707/822 |
| 8,667,032 B1* | 3/2014 | Shilane | G06F 17/30156 | 707/825 |
| 9,424,263 B1* | 8/2016 | Aston | G06F 3/0608 | |
| 9,430,330 B1* | 8/2016 | Bardhan | G06F 11/1448 | |
| 9,646,014 B1* | 5/2017 | Jain | G06F 17/30135 | |
| 2004/0030822 A1* | 2/2004 | Rajan | G06F 3/0605 | 711/4 |
| 2004/0133570 A1* | 7/2004 | Soltis | G06F 16/182 | |
| 2005/0125593 A1* | 6/2005 | Karpoff | G06F 3/0605 | 711/4 |
| 2005/0187985 A1* | 8/2005 | Edwards | G06F 3/0613 | |
| 2005/0228963 A1* | 10/2005 | Rothman | G06F 3/0613 | 711/170 |
| 2007/0113036 A1* | 5/2007 | Gal-Oz | G06F 3/0608 | 711/165 |
| 2007/0168678 A1* | 7/2007 | Meenakshisundaram | G06F 12/1483 | 713/189 |
| 2007/0220208 A1* | 9/2007 | Nomura | G06F 12/0862 | 711/137 |
| 2007/0226265 A1* | 9/2007 | Nichols | G06F 3/061 | |
| 2007/0226445 A1* | 9/2007 | Nichols | G06F 17/30952 | 711/170 |
| 2007/0260842 A1* | 11/2007 | Faibish | G06F 3/061 | 711/170 |
| 2009/0019147 A1* | 1/2009 | Ahlers | H04L 43/0876 | 709/224 |
| 2009/0055450 A1* | 2/2009 | Biller | G06F 16/1724 | |
| 2012/0109936 A1* | 5/2012 | Zhang | G06F 17/30312 | 707/713 |
| 2012/0117322 A1* | 5/2012 | Satran | G06F 3/0625 | 711/114 |
| 2012/0143832 A1* | 6/2012 | Aronovich | G06F 17/30156 | 707/692 |
| 2012/0179446 A1* | 7/2012 | Tylutki | G06F 11/3442 | 703/21 |
| 2012/0265959 A1* | 10/2012 | Le | G06F 9/45558 | 711/162 |
| 2013/0262801 A1* | 10/2013 | Sancheti | G06F 3/065 | 711/162 |
| 2013/0275375 A1* | 10/2013 | Nickolov | G06F 9/4856 | 707/636 |
| 2013/0326186 A1* | 12/2013 | Shaikh | G06F 11/1435 | 711/170 |
| 2014/0019706 A1* | 1/2014 | Kanfi | G06F 16/122 | 711/171 |
| 2014/0075557 A1* | 3/2014 | Balabine | H04L 63/20 | 726/23 |
| 2014/0215125 A1* | 7/2014 | Sela | G06F 12/0292 | 711/103 |
| 2015/0220552 A1* | 8/2015 | Duzly | G06F 3/0688 | 707/693 |
| 2016/0253340 A1* | 9/2016 | Barth | G06F 17/30082 | 707/756 |

OTHER PUBLICATIONS

Wolloch. "How do EBS Snapshots and EBS Volume Restore Work?" Published May 21, 2014. N2W Software. URL: https://web.archive.org/web/20141107200535/https://n2ws.com/blog/how-do-ebs-snapshots-ebs-restore-work.html. Retrieved Jan. 2018.*

Statistics Solutions. "Data Levels of Measurement". Jul. 17, 2014 snapshot via Archive.org. URL Link: http://www.statisticssolutions.com/data-levels-of-measurement/. Accessed Sep. 2018. (Year: 2014).*

* cited by examiner

METADATA ANALYTICS FOR ONLINE FRAGMENTATION DETECTION ON UNIX FILE SYSTEMS AND COMMON BLOCK FILE SYSTEMS

TECHNICAL FIELD

Embodiments are generally directed to data storage systems, and more specifically to file system management methods for detecting file layout issues.

BACKGROUND

Data storage systems use specialized hardware and software along with storage media (e.g., disk, tape drives or flash memory) to provide fast and reliable storage for computing and data processing applications. Traditional storage systems rely on static definitions of system resources, such as host and storage IDs. Virtualization of storage helps achieve location independence by abstracting the physical location of the data. The virtualization system provides a logical space for data storage and the logical space to the actual physical location, but also adds a dynamic element to the definitions of system resources, as storage addresses are no longer statically tied to physical memory locations.

The Unix file system (UFS) has become the standard file system for most modern data storage systems, and advanced storage systems use updated variants such as the 64-bit UFS (UFS64). The UFS64 file system provides various advantages such as the ability to scale in size while providing capacity efficiencies and robust error-recovery mechanisms. Other file systems used by current data storage systems include the Common Block File System (CBFS), which creates virtual devices that emulate physical storage and presents data to users as files and folders of a local virtual disk. High capacity file systems, and especially those that implement or facilitate virtualization present certain file management issues, such as file system fragmentation, which is caused by non-contiguous or non-sequential layout of related data on the physical storage devices. Thus, the introduction of the advanced storage virtualization techniques like thin provisioning, multi-level stacking of the file systems, write anywhere snapshots, and de-duplication results in non-linear and disjoint layout of the volumes, file system, files and objects hosted by the file system. The non-contiguous nature of the volumes, file system/file/objects leads to address space fragmentation, which in turn leads to poor system performance. In particular, these issues impact the latency and the effective throughput of the system for certain types of workloads.

Techniques for performing fragmentation detection in file systems are relatively common in the storage world and there are many proven ways to detect and address the fragmentation of file system and files. Current approaches, however, are tied to specific storage system architectures, and most fragmentation detection algorithms depend on static layout analysis to determine the fragmentation. Thus, although other systems may support fragmentation detection and defragmentation, they consider only the static layout of the file system and files and do not take into consideration the fact that virtualization in the storage brings many order of indirections, and characteristics such as media specific performance sensitive layout policies, cache density, cache efficiency, the nature of the workload, and so on. In addition, no practical fragmentation detection solution exists for UFS64, CBFS and other advanced file systems.

What is needed, therefore, is a system and method of detecting fragmentation by taking many variants of the end-to-end architecture of the storage system into consideration, as opposed to simply the static layout of the system. What is further needed is a system that takes into consideration system and application-specific characteristics, such as the nature of the workload, the effect of multiple layers of virtualization, cache density, spread of the IO (input/output) on the backend spindles, nature of the media, and so on.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC and VNX are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
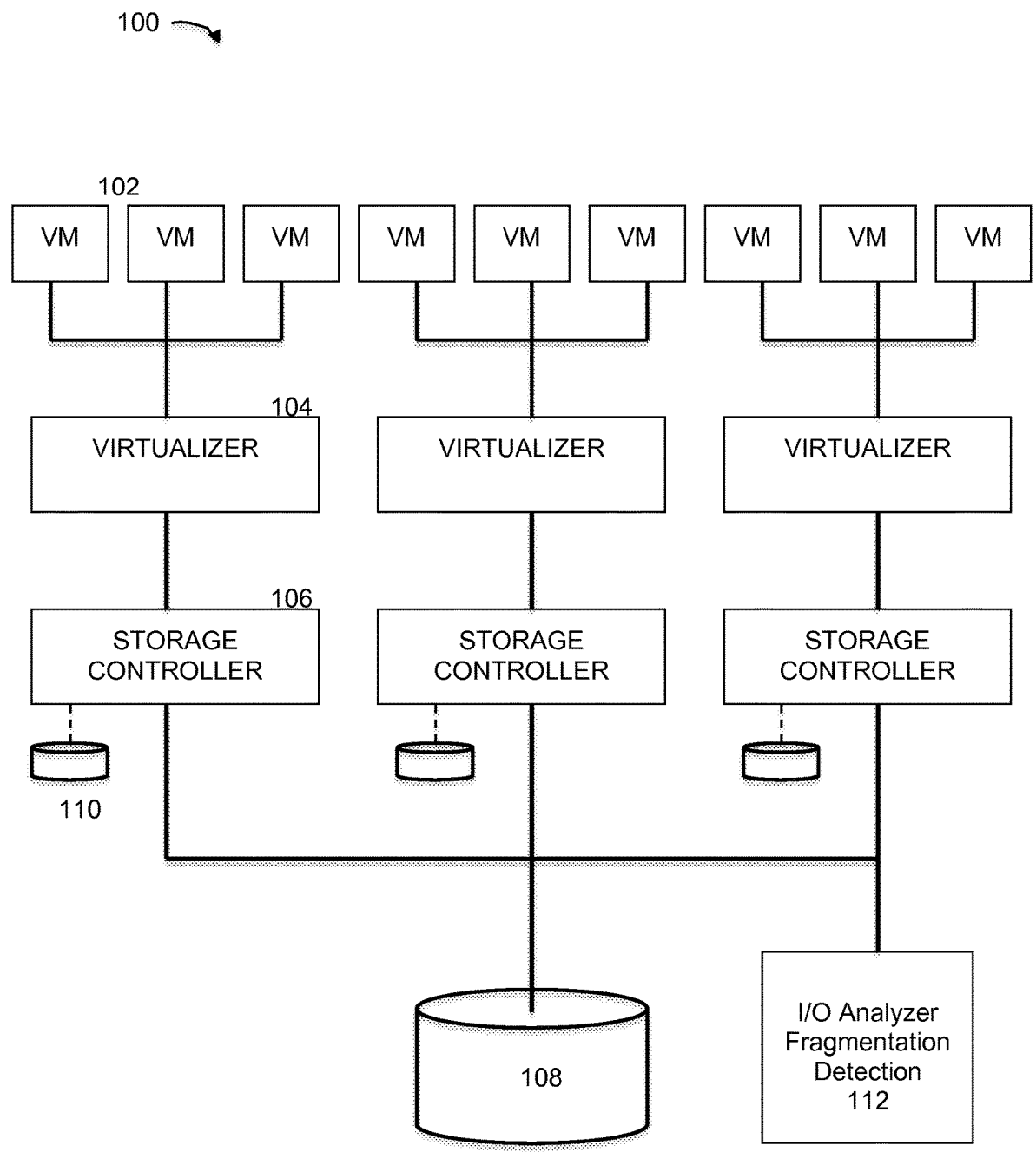
FIG. 1 illustrates an example data storage system that implements a fragmentation detection process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of detecting fragmentation and other data organization issues in advanced and virtualized file storage systems. A file system analysis platform and associated computer-implemented methodology using metadata analytics detects data or file fragmentation taking many variants of the end-to-end architecture of the storage system into consideration, as well as operational parameters such as, nature of the workload, the effect of multiple layers of virtualization (e.g., stacking file system on files drawn from another sparse file system), cache density, the spread of the I/O on the backend spindles, nature of the media, and so on.

FIG. 1 illustrates an example data storage system that implements a fragmentation detection process, under some embodiments. System 100 represents a data storage system for a plurality of virtual machines (VM) 102 that store their data on one or more storage devices 108 and/or 110. A number of VMs are coupled to a virtual storage interface 104 that provides access to a respective storage controller 106 that transmits data to and from a storage device, such as a networked storage device 108 or closely coupled storage devices 110. In an embodiment, storage device 108 represents a shared storage hardware system comprising a large capacity disk (magnetic or optical) or array of disks (e.g., RAID) or flash memory and that may be part of a storage area network (SAN) or network-attached storage device (NAS). Alternatively, storage appliances comprising storage controllers with dedicated or attached disks/memory 108, such as internal storage within server computers, may be used. The virtual storage interface can include or comprise a server virtualization platform that virtualizes applications and simplifies virtual data centers that can comprise any number of VMs 102. An example of a particular implementation of a virtualizer is the VMware Sphere system, though other similar systems may also be used. The storage controller 106 and storage devices 108 or 110 represent a storage system that implements file system that can be configured for file, block and object storage for legacy and virtualized data storage applications. In an embodiment, the storage system implements an advanced file system, such as UFS64 (64-bit Unix file system) or a common bock file system (CBFS). The file system provides an access protocol that enables users to access files and folders from Linux/UNIX (or other) hosts located on a network. An example implementation of a storage system is the VNX storage system by EMC Corporation, or similar platform that allows users to manage and share files in multi-protocol (NFS and CIFS, common Internet file system) environments. Data from various different applications and mixed workloads (physical and virtual) is optimized for storage in a virtual storage pool that can include storage devices such as high performance flash and/or high-speed/high-capacity hard disk drives (HDD).

Storage systems, such as that illustrated in FIG. 1 can provide either block-accessed storage (such as delivered over Fibre Channel, iSCSI, SAS, FICON or other protocols), or file-accessed storage (such as provided by NFS or CIFS protocols). It is possible to have multiple layers of virtualization or mapping and for the output of one layer of virtualization to be used as the input for a higher layer of virtualization. Virtualization maps space between back-end resources, to front-end resources, where the back-end refers to a logical unit number (LUN) that is not presented to a computer, or host system for direct use, while a "front-end" LUN or volume is presented to a host or computer system for use. The virtualization software or device is responsible for maintaining a consistent view of all the mapping information for the virtualized storage. This mapping information is often provided as metadata that is stored as a mapping table.

As shown in FIG. 1, the system 100 includes an I/O analyzer and fragmentation component 112, which may be implemented as a functional process (e.g., software program or special hardware component or combination thereof) performed by or within one or more of the storage controllers 106, or by a separate computer implemented process. The analyzer/detection component essentially provides and implements a holistic approach to file system problem solving that deterministically detects the impact of the fragmentation of data within the storage system and determines their root causes so that appropriate measures can be effected through layout defragmentation, re-tiering or cache configuration or other appropriate solutions. The component 112 implements an analytics-based approach that draws the I/O workload envelope from collected I/O traces and determines the effect of the fragmentation automatically. This results in a deterministic way of assessing the effect of fragmentation on I/O performance of the system.

While modern storage system arrays are often designed with deep caches to buffer the effect of fragmentation, the sheer scale of modern system constrains the level of improvements one can achieve with the write back and write through cache-based systems. File system fragmentation is typically a manifestation of various phenomenon in the storage system, right from random allocation against the object (file/block) address space to granularity of the block and the I/O access patterns. Current methodologies for systems that host the file system for file and block accesses generally do not address the issue of fragmentation holistically and mostly look only at the static layout of the object. They neither detect the layout conditions that lead to fragmentation phenomenon, nor re-layout the file system or files to cure the fragmentation. The primary disadvantages of not detecting the layout anomalies are performance degradation and extended overhead in re-tiering the address space of the file system objects and file systems. At times defragmentation can also lead to resiliency issues.

The analyzer/detection component 112 is configured to detect fragmentation and other relevant data organization and storage issues taking may variants of the end-to-end architecture of the storage system 100 into consideration. In addition to static layout characteristics, the component 112 looks at the nature of the workload, the effects of virtualization, cache density, spread of I/O operation on the back-end spindles, the nature of the storage media, and other relevant parameters. The system uses static and dynamic traces to determine the effect of fragmentation for various workloads and applies analytics algorithms to detect fragmentation.

Figure 2:
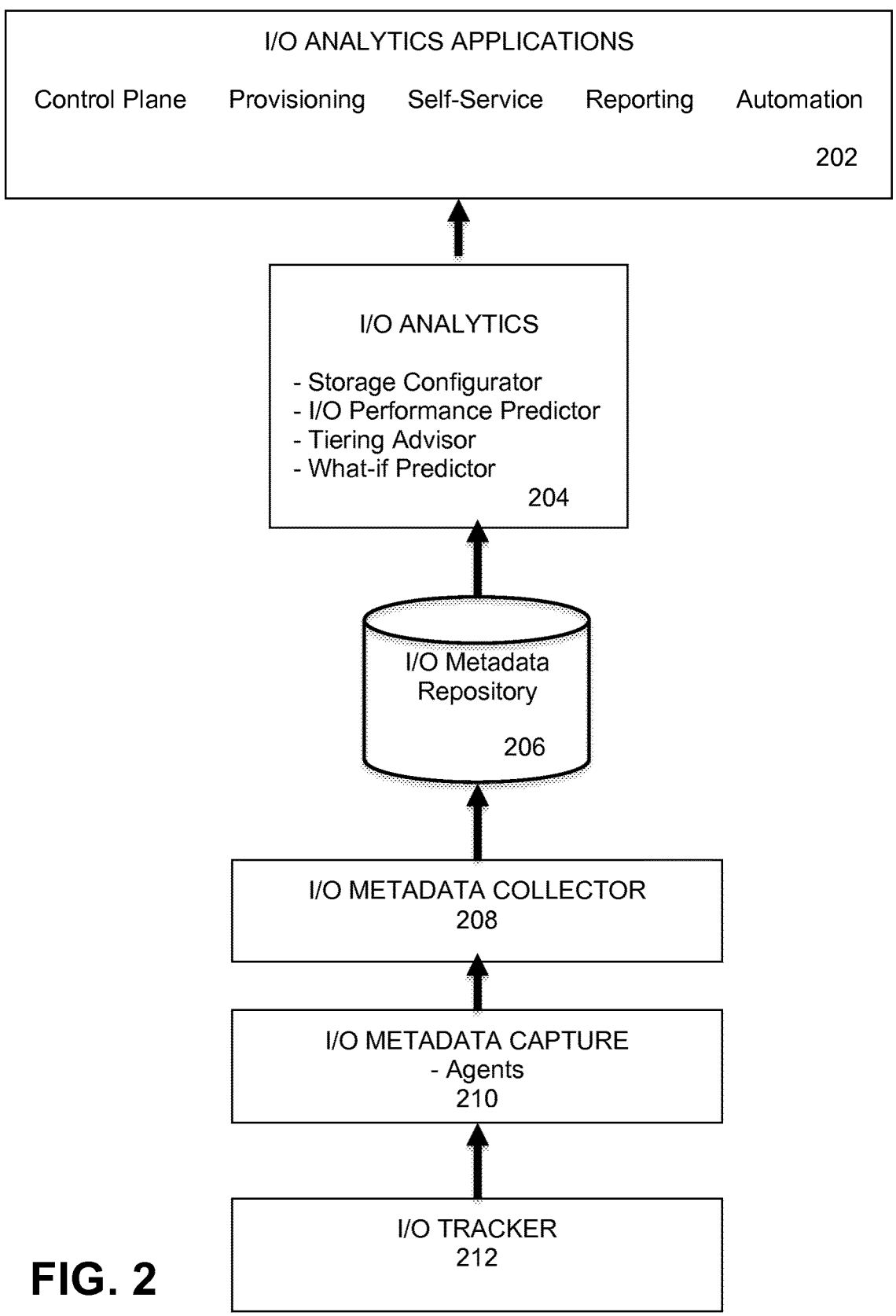
FIG. 2 illustrates an I/O analytics platform used in a fragmentation detection component, under some embodiments.

FIG. 2 illustrates an I/O analytics platform used in a fragmentation detection component, under some embodiments. The I/O analytics platform 200 represents a unified real-time, fine granularity I/O pattern capturing and analytics facility that provides insights into I/O workloads and enables automation, optimization, and prediction of storage characteristics for a data storage system. System 200 provides an I/O analytics platform for data storage arrays, such as an EMC VNX file platform. The analytics platform provides tools for providing value added analytics to assess the effect of fragmented layout on the I/O performance of the system. In an embodiment, a "big data" analytics paradigm to provide the analysis based on details of static and dynamic traces that are collected in the system to determine the effect of fragmentation for various workloads, and that comprise certain analytics algorithms deployed for detecting the fragmentation.

At the bottom layer of system 200 is an I/O tracker 212, also referred to as a "splitter." In an embodiment, every write operation is tracked and stored as a different snapshot, or a group of writes can be aggregated according to configuration specifications. For applications such as data protection and recovery, the tracked write operations are copied and stored remotely. In this way, writes are effectively split between the primary storage and the recovery storage locations. The methods of write splitting include host-based, fabric-based and in the storage array. The tracked I/O is then processed through agent processes (agents) within an I/O metadata capture layer 210. Typically the agents reside within the storage platform (e.g., VNX, Data Domain, etc.). Different agents can be defined based on the data source and file system (e.g., UFS64, CBFS, CIFS, etc.). The agents collect I/O traces from the system. I/O metadata collector 208 collects the metadata for the I/O traces and stores them in an I/O metadata repository 206, which can be a Hadoop cluster in a representative embodiment. The I/O metadata can be stored in repository 206 in a compressed, time-sliced format. In this manner, I/O traces comprise every write operation in the storage system, which are tracked and stored as a different snapshot in the system.

The metadata is then analyzed by an I/O analytics component 204, which may represent a "big data" analytics component since it works on data sets that are large enough and complex enough, i.e., real-time I/O traces in a large, virtualized data storage network. The analytics component 204 can include sub-components such as a storage configurator, I/O performance predictor, tiering advisor, and what-if predictor. The I/O analytics component generally provides guidance with regard to finding the right storage configuration for a particular user or customer workload, determining performance parameters if the system deploys a captured I/O workload on alternate storage configurations, determining the storage platform that performs the best for a captured I/O workload, determining performance behavior if cache, disks, ports, nodes, etc. were added to a captured I/O workload, determining if a particular storage system will hit a performance bottleneck in the future, factors that lead to performance issues, and possible ways of alleviating these issues. The I/O data provided by the I/O analytics layer 204 can be analyzed and processed using any one of various I/O analytics applications 202, such as provisioning, self-service, reporting, automation, and so on. The I/O capturing and analytics system 200 provides big data analytics insights into detailed I/O workloads in virtualized data storage systems. The capturing layer 210 performs real-time capturing of I/O metadata and unified, detailed I/O tracing up to a single I/O operation. Implementations generally result in a lightweight footprint, e.g., 1 million I/O operations per second generate about 20 MB/second tracing, for example. The analytics component may generally be referred to as an I/O analytics component or metadata I/O component, and generally works by applying analytics processes to captured metadata generated by or from I/O operations to/from/within the data storage system.

Figure 3:
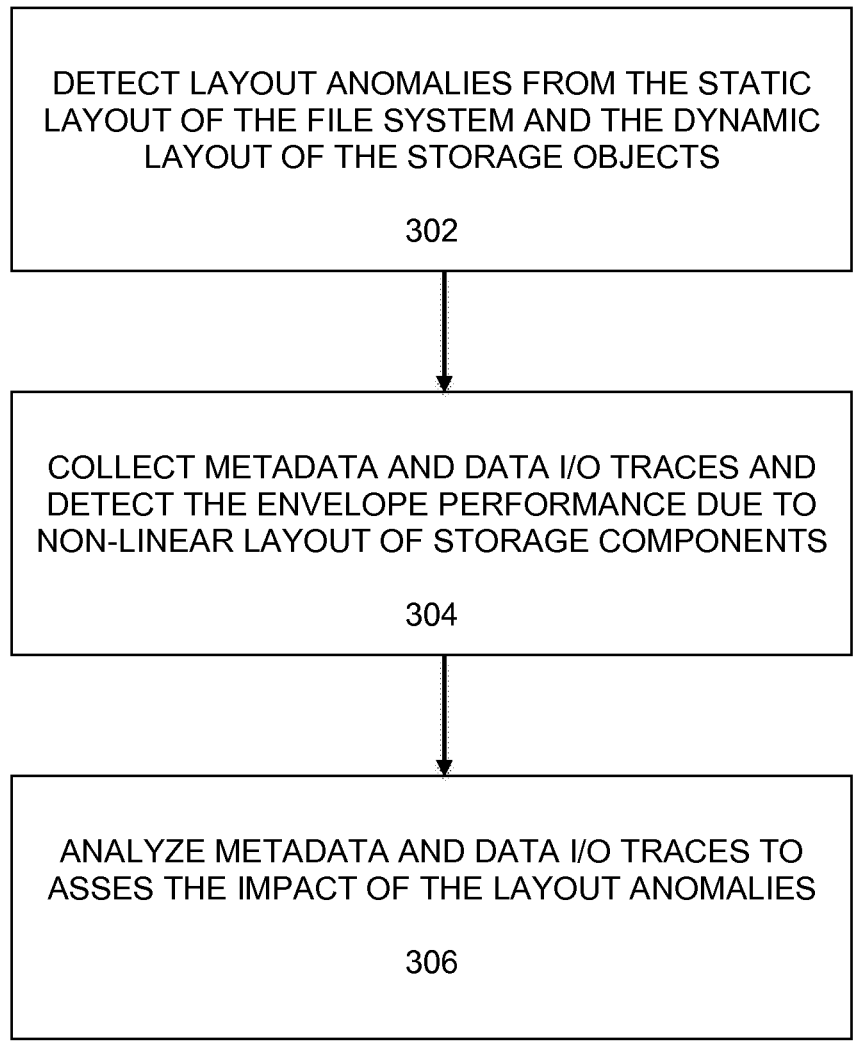
FIG. 3 is a flowchart that illustrates a method of performing fragmentation detection under an embodiment.

FIG. 3 is a flowchart that illustrates a method of performing fragmentation detection under an embodiment. The system 200 of FIG. 2 generally performs a method as shown in FIG. 3 including performing a detection of layout anomalies from the static layout of the volume manager and file system and dynamic layout of the storage objects drawn from the file system, block 302. The system then collects the metadata and data I/O traces end-to-end and detects the envelope performance due to non-linear layout of the pools, (single and stacked) file system, files and the cache, block 304. In this context, the cache is considered as in-memory representation of the files and file system. It also performs an analysis of metadata and data I/O traces to assess the impact of the layout anomalies and detecting hot regions that could impact performance due to fragmented address space, block 306.

Present known fragmentation analysis tools detect fragmentation based only on the static layout of the objects. As shown in FIG. 3, dynamic layout is also taken into consideration, under embodiments. The dynamic layout characteristics comprise address locations that move or are reassigned during the storage of data, such as by virtualization mechanisms. In addition, the system considers workload patterns and the effect of metadata and data caching sub-system while analyzing the object layouts deeply considering all the layers involved. The system uses I/O trace analysis to co-relate the actual I/O performance impact caused by the layouts, and uses a general purpose I/O analytics platform to organize the I/O trace repository for optimal and offline analysis. The system includes an online analytics application that detects the fragmentation using the layout configuration data. The methodology can be applied to other block and file platforms to detect the fragmentation and assess its impact on the performance. Furthermore, the methodology can be applied to other organizational and storage issues other than fragmentation to assess the impact of these issues on system performance.

The I/O metadata collection and analytics system 200 generally provides the basis of a fragmentation analytics model that comprises certain functional components. First, a collection of object configuration data, comprising layout information of the volumes, files systems and files. The layout policies of the volume, file system and the files address the sequential placement of the slides and data blocks. However, the I/O patterns determine the layout as the allocation happens on first-come, first-serve basis. Also the first write after the snapshot would re-layout the newly written address space and allocation policies may not be able to address the location proximity needs of the primary files address space. Second, the data and metadata cache configuration. The cache configuration (write back or write through) and the cache density would buffer the effect of fragmentation to a reasonable extent, and again the nature of workload would determine the effectiveness of the cache. Third, determining and collecting the traces needed to determine the end-to-end envelope performance. The information needed to determine the envelope I/O pattern and the effective performance delivered is also part of the claim as they are critical to assess the effect of the fragmentation. Fourth, the organization of the traces, which lend themselves for scaling with regard to object size and count. Fifth, analyzing the traces for fragmentation, which provides the basis for performing analytical analysis with respect to one type of organizational issue, though others are also possible.

With respect to fragmentation, which generally refers to the non-contiguous or non-sequential layout of related data on a disk or in memory, the fragmentation analytics engine implements an algorithm to determine an amount of fragmentation in a system. The degree of fragmentation can be expressed as a product of various factors including:

(1) layout of various stacked objects
(2) number of backend I/O operations for a front I/O and spread across spindles
(3) metadata cache efficiency
(4) data cache efficiency
(5) performance of the media type Other parameters are also possible, and the above list represents parameters for an example embodiment. In an embodiment, the fragmentation determination algorithm is expressed as follows:

Fragmentation=$fn$((layout of various stacked objects) (number of backend I/Os for a front I/O and the spread across spindles)(metadata cache efficiency)(data cache efficiency),(performance of the media type))

The function $fn$ in the above algorithm implements certain rules to determine a "Fragmentation" value. Examples of certain sample rules are as follows:

Rule 1: If the layout for the address range is end-to-end sequential on the media and the number of backend metadata I/O ops>1 and the number of resulting spindle I/O ops>N and I/O density (ratio of cached and cache miss) is >0.5, then there is likely to be fragmentation effect Rule 2: If the layout of the address range is non-sequential on the media and the number of backend metadata I/O ops>1 and the number of resulting spindle I/O ops>N and I/O density (ratio of cached and cache miss) is >0.5, then there is likely to be fragmentation effect.

Rule 3: If the layout of the address range is sequential and if the I/O density is <0.5 then there is no fragmentation.

Rule 4: If the layout of the address range is non-sequential and if the I/O patterns is random and the cache miss ratio is high and the backend I/O ratio is >0.5 there is an effect of fragmentation Rule 5: With respect to Rule 4, if the I/O ops are spread across multiple non-overlapping disks then there is less fragmentation effect on the I/O latency.

Rule 6: If the upper deck file layout is contiguous and the lower deck file layout is fragmented (due to file system snaps) the I/O is non-sequential and if the backend IO to the same device is high then the fragmentation effect is high.

Rule 7: If the upper deck file layout is contiguous but the metadata layout is non-sequential and the metadata cache efficiency is low then the effect of fragmentation is high.

Rule 8: If the upper deck file system layout is contiguous, the metadata layout is fragmented (due to file system snaps) and the metadata I/O is spread across multiple devices then the effect of fragmentation is high.

Rule 9: If the layout of the bottom deck file system is not contiguous, if the file system on file volume is contiguous, but it is mapped onto high-speed media, the fragmentation effect is negligible.

Rule 10: If the lower deck file system metadata is on flash memory but the lower deck file data layout is not contiguous the resulting backend I/O (Cache miss) is high, the effect of fragmentation is moderate.

As shown above, the rules may express the degree of fragmentation in relative subjective terms, such as high, low, moderate, negligible, and so on. In an embodiment, the system may apply scalar values to the degree of fragmentation for each rule, as well as a spread of appropriate values for each relevant parameter, such as cache miss ratios, contiguity, amount of spread across devices, and so on. The function $fn$ that determines the product for Fragmentation thus results in a number that can be compared against a defined scale to determine whether the amount of fragmentation is an issue or not with regard to system performance.

The values for each rule also provide a relative basis for comparing the amount of fragmentation resulting from each operational parameter. This provides the system a means to report one or more root or primary causes of the fragmentation, and also provides the basis for suggesting remediation for a workload. In an embodiment, the remediation could be one of the following, based on the rules above: perform a sequential re-layout; increase the cache size; distribute the workload across multiple spindles; move to faster media; re-layout the upper deck file; re-layout the upper deck file system; spread the CBFS file; spread the CBFS file system; re-layout the CBFS file; re-layout the CBFS file system; move CBFS metadata to high-performance media. Other similar remediation steps could also be suggested or taken depending on the rules, and system constraints/configuration.

Figure 4:
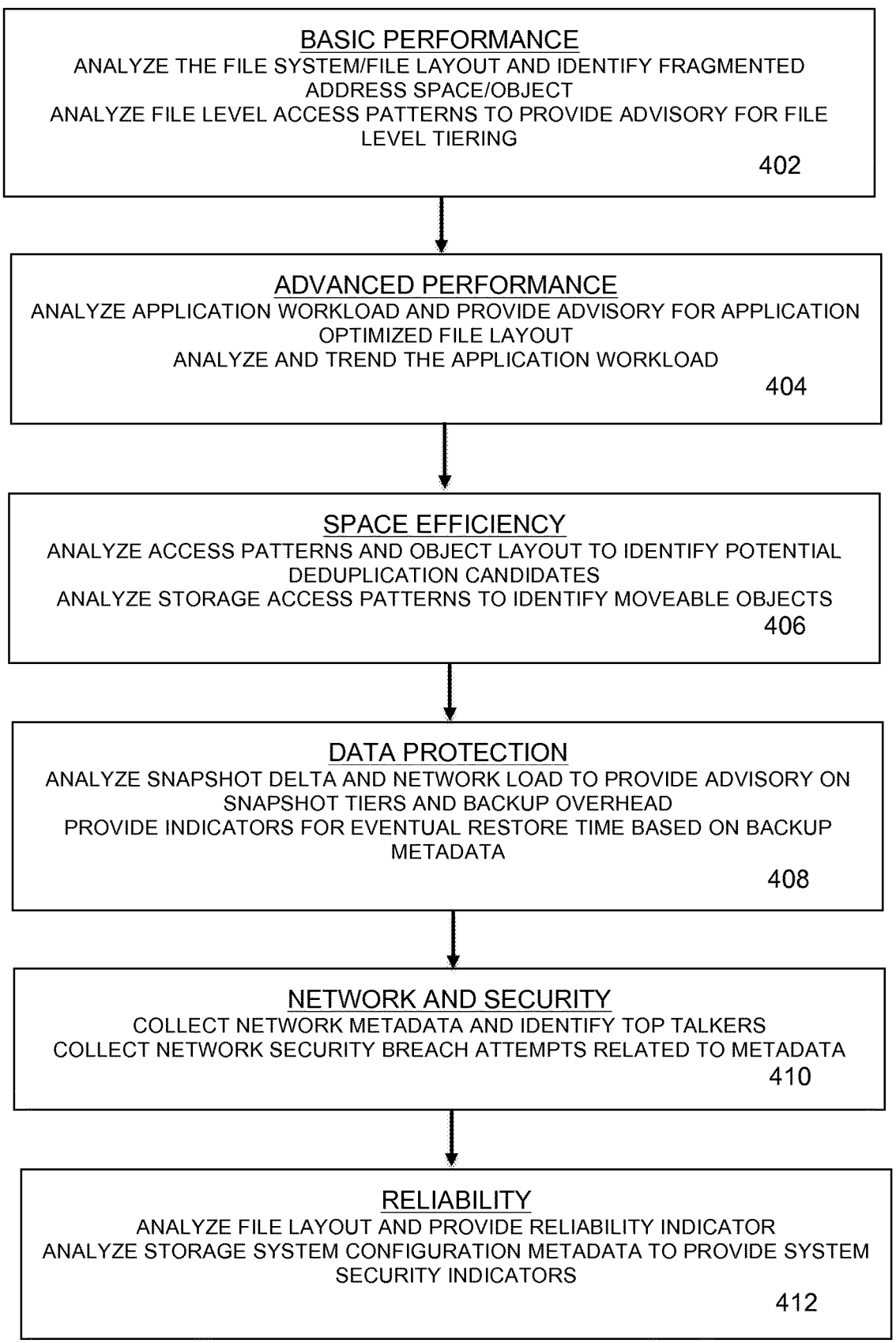
FIG. 4 is a flow diagram illustrating analysis processes for these example use cases, under an embodiment.

Various different use cases may take advantage of the analytics performed by the system. These include basic and advanced performance analysis, space efficiency, data protection, network and security, and reliability. FIG. 4 is a flow diagram illustrating analysis processes for these example use cases, under an embodiment. With respect to basic performance 402, the system analyzes the file system and file layout and identifies fragmented address space or objects and provides a re-layout advisory or advisories to improve performance. It also analyzes the file level access patterns and provides an advisory for file level tiering. With respect to advanced performance 404, the system analyzes the application workload and provides advisories for application optimized file layout. It also analyzes and trends the application workload access patterns with respect to time of day and proactively provides read-ahead, caching and tiering advisories.

To improve performance with respect to space efficiency 406, the system analyzes the access patterns and object layout and content, and identifies any potential de-duplication candidates. It can also provide potential efficiency indicators and costs savings with respect to space usage. The system then analyzes the storage access patterns and identifies objects that can be moved to the archive tiers and back. With respect to data protection 408, the system analyzes the snapshot delta and provides advisories on the snapshot tier(s). It analyzes the snapshot delta and network load, and provides advisories on backup overhead and backup performance. Based on the backup metadata, the system provides indicators for eventual restore time windows as well as performance and target tier(s). For network and security issues 410, the system collects network metadata and identifies top (e.g., top 10) talkers and congested ports. It also collects network security breach attempts related metadata and provides security warnings. For this, the system can be configured to provide network control and file system user level access control tracking. With respect to reliability issues 412, the system analyzes the file layout in an end-to-end manner, such as from file extents to spindles, and provides reliability indicators on a per file/file system basis. The system also analyzes the storage system configuration metadata and provides system wide reliability indicators.

Figure 5:
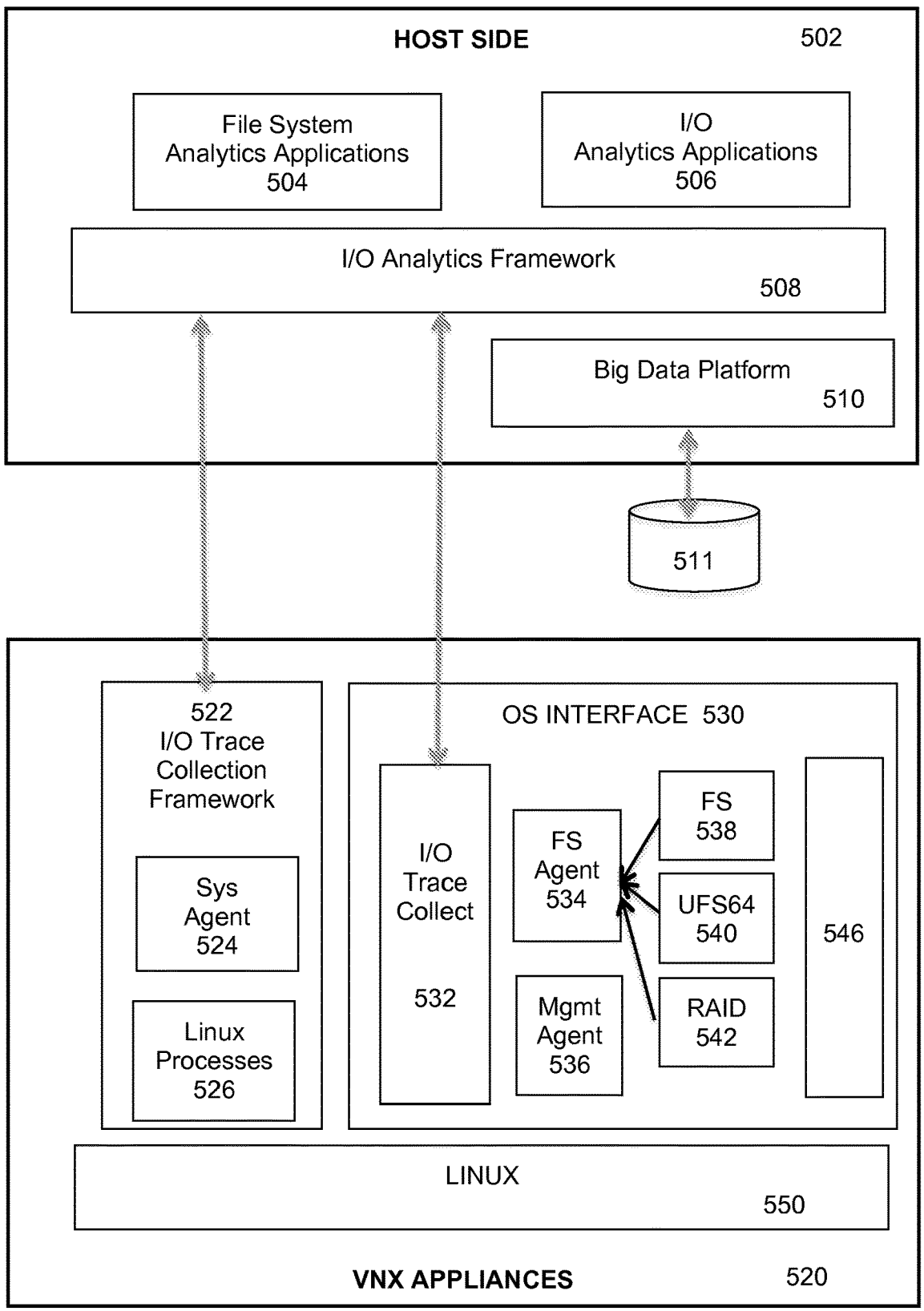
FIG. 5 is a block diagram that illustrates an implementation of an I/O analytics framework for an example UFS64 or similar file system, under some embodiments.

As described above, the fragmentation detection system may be implemented on an EMC VNX based system, or any similar system that uses an advanced file system such as UFS64. FIG. 5 is a block diagram that illustrates an implementation of an I/O analytics framework for an example UFS64 or similar file system, under some embodiments. System 500 illustrates an interaction among functional components in a host-side system 502 and a VNX appliance side 520. The host-side 502 includes a file systems analytics application component that analyzes the file system metadata and I/O traces and provides advisories. An I/O analytics framework 508 receives input from both the file system analytics 504 and I/O analytics 506 and collects, collates and stores the raw traces. It also provides I/O analytics management, abstracts commonly used I/O analytics functions, and abstracts reporting and control functions. A big data platform 510 may be coupled to a local or network storage device 511, and organizes the traces as "big data" This platform may be implemented as a big data infrastructure, such as Hadoop or any other appropriate infrastructure.

The VNX appliances system 520 of system 500 includes an operating system (OS) layer, such as Linux, an OS interface layer 530 and an I/O trace collection framework 522. The I/O trace collection framework 522 interacts with the I/O analytics framework 508, and includes a system agent 524 and Linux processes 526. The system agent 524 collects system level events and exceptions, and also collects system level statistics and performance counters. The Linux processes perform other OS-centric tasks, such as system management, and so on. The OS layer 550 may itself also be coupled to a local or network storage device (not shown). The OS interface layer 530 includes an I/O trace collection function 532 that provides portable trace collection (generic), normalizes the I/O traces and presents/streams them to the I/O analytics framework 508. This component 532 interacts with a file system agent 534 and a management agent 536, which collects system metadata. The file system agent 534 receives data from the file system 538 (e.g., NIFS or CIFS), the UFS64 stack 540 and the storage devices (e.g., RAID) 542 to collect UFS64 (or CBFS) metadata and also to collect file system data I/O traces. The OS interface layer 530 may also include a DART microkernel, in which a DART stack runs as a Linux process.

Although FIG. 5 illustrates an embodiment in which a VNX appliance system is used with a UFS64 and Linux architecture, it should be noted that embodiments are not so limited. VNX represents on type of storage system that provides file/block/object storage and that can be used with UFS64 or any similar file system, and other possible storage systems, file systems, and operating systems are also possible.

Figure 6:
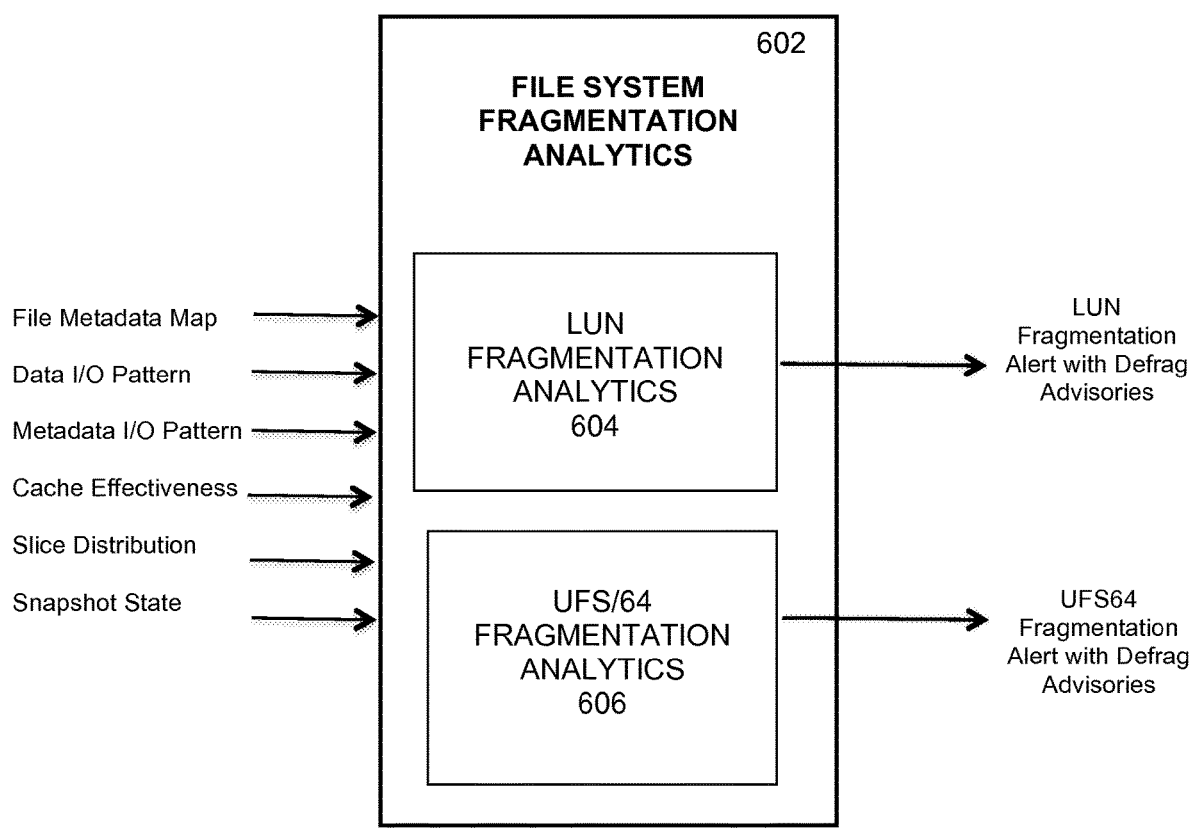
FIG. 6 is a block diagram illustrating the file system analytics meta model, under an embodiment.

As shown in FIG. 5, the system 500 the storage system layer 520 (e.g., VNX appliances) include agents that return file system metadata and I/O traces back to an I/O analytics framework 508 running on the host-side 502. A file systems analytics component 504 analyzes the file system metadata and data I/O traces and provides advisories. FIG. 6 is a block diagram illustrating the file system analytics meta model employed by the file systems analytics component 504, under an embodiment. As shown in diagram 600, a file system fragmentation analytics component 602 includes a logical unit number (LUN) fragmentation analytics component 604 and a UFS64 fragmentation analytics component 606. These components receive certain data such as a file metadata map, data I/O patterns, metadata data I/O patterns, cache effectiveness data, slice distribution, and snapshot state information. In turn, the analytics components 604 and 606 respectively output and LUN fragmentation alerts with defragmentation advisories in the event that fragmentation at the LUN level is detected and/or UFS64 fragmentation alerts with defragmentation advisories in the event that fragmentation at the UFS64 level is detected.

Embodiments may be applied to detecting fragmentation or other organizational issues on practically any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of detecting a data organization issue in a storage system including a backup server computer coupled to storage devices and executing a backup process, comprising:
   collecting input/output (I/O) traces as dynamic traces for data transfers to and from the storage devices in a virtualized file system that creates virtual devices that emulate physical storage and presents data as files of a local virtual disk, for address locations that move due to virtualization that maps space between a back-end LUN (logical unit number) not presented to a host computer, and a front-end LUN that is presented to the host computer;
   collecting file system traces as static traces for file and volume layout information of the data storage;
   tracking, in a splitter component of the backup server computer, write operations captured in the dynamic traces to the storage devices organized into primary and recovery storage locations;
   storing each write operation as a snapshot backup on the storage devices;
   storing, by a metadata collector, metadata for each write operation in a metadata repository;
   processing, by an analytics component, the dynamic and static traces to determine an effect of fragmentation for various workloads;
   analyzing, in an analytics component processing the dynamic and static traces, both a static layout of the file system and layout conditions leading to fragmentation, by analyzing the metadata to determine an amount of address space fragmentation manifested as non-contiguous storage of file data by the backup process by calculating a fragmentation value through a formula combining factors comprising a sequentiality of addresses within the virtual file system for file system objects spread among the different virtual disks, a number of backend input/output (I/O) operations; cache efficiency of metadata and data caches, and performance of the storage devices, to detect data organization issues in the virtual file system using metadata analytics and operational parameters to identify one or more indicators of the fragmentation;
   applying a plurality of rules to calculate the fragmentation value on the basis of factors comprising a relative amount of address sequentiality, number of backend metadata operations, I/O density, randomness of I/O patterns, cache miss ratio, I/O operation disk spread, and fragmentation in the virtual file system and storage on flash memory;
   expressing the calculated fragmentation value as one of a subjective relative characterization or a number that can be compared against a defined scale to facilitate determining if the amount of address space fragmentation presents a system performance issue; and
   suggesting remediation steps for a workload to reduce the amount of address space fragmentation across the virtual disks, to thereby improve space utilization by the backup process.

2. The method of claim 1 further comprising comparing the fragmentation value as the number against the defined scale of threshold values to determine whether the address space fragmentation is above an acceptable level, and wherein the subjective relative characterization comprises high, low, moderate, and negligible fragmentation.

3. The method of claim 2 wherein the data is organized as files, blocks, or objects on the storage system.

4. The method of claim 3 further comprising, if the fragmentation value is above a minimum threshold value, implementing one or more of the suggested remediation steps to reduce the address space fragmentation.

5. The method of claim 3 wherein the storage system for the local virtual disk includes one or more virtual machines.

6. The method of claim 5 wherein the virtual file system comprises one of a Unix File System 64 (UFS64) and a Common Block File System (CBFS).

7. The method of claim 5 wherein the address space fragmentation within the virtual file system is caused by non-sequential storage of files or file data by reassignment of address locations by the virtualization mechanisms.

8. The method of claim 4 wherein the remediation steps comprise at least one of: sequential addressing or re-tiering of the data in the data storage system, increasing a cache size, re-distributing storage workload across multiple spindles of the storage devices, using of faster storage devices; and updating file system pointers to memory blocks after defragmentation occurs.

9. The method of claim 1 wherein the formula comprises a product of the factors, the method further comprising applying a rule to each of the factors to determine a factor value for a respective factor of the formula.

10. The method of claim 1, further comprising:
performing an I/O analytics process on the collected I/O traces to provide first organization layout advisories; and
performing a file system analytics process on the collected file system traces to provide second organization layout advisories.

11. A system for detecting data organization issues in a storage system utilizing a file system including one or more virtual machines, comprising:
an input/output (I/O) metadata capture component collecting input/output (I/O) traces as dynamic traces for data transfers to and from the storage devices in a virtualized file system that creates virtual devices that emulate physical storage and presents data as files of a local virtual disk, for address locations that move due to virtualization that maps space between a back-end LUN (logical unit number) not presented to a host computer, and a front-end LUN that is presented to the host computer;
a file system metadata capture component collecting file system traces as static traces for file and volume layout information of the data storage;
an I/O analytics component performing an I/O analytics process on the collected I/O traces to provide first organization layout advisories;
a file system analytics component performing a file system analytics process on the collected file system traces to provide second organization layout advisories;
a splitter component tracking write operations captured in the dynamic traces to storage devices organized into primary and recovery storage locations;
a backup process storing each write operation as a snapshot backup on the storage devices;
a metadata collector storing metadata for each write operation in a metadata repository; and
an analytics component holistically analyzing both a static layout of the file system and layout conditions leading to fragmentation, in an analytics component processing the dynamic and static traces to determine an effect of fragmentation for various workloads, by analyzing the metadata to determine an amount of address space fragmentation manifested as non-contiguous storage of file data by the backup process by calculating a fragmentation value through a formula combining factors comprising a sequentiality of addresses within the virtual file system for file system objects spread among the different virtual disks, a number of backend input/output (I/O) operations; cache efficiency of metadata and data caches, and performance of the storage devices, to detect data organization issues in the virtual file system using metadata analytics and operational parameters to identify one or more indicators of fragmentation, by applying a plurality of rules to calculate the fragmentation value on the basis of factors comprising a relative amount of address sequentiality, number of backend metadata operations, I/O density, randomness of I/O patterns, cache miss ratio, I/O operation disk spread, and fragmentation in the virtual file system and storage on flash memory and expressing the calculated fragmentation value as one of a subjective relative characterization or a number that can be compared against a defined scale to facilitate determining if the amount of address space fragmentation presents a system performance issue, and suggesting remediation steps for a workload to reduce the amount of address space fragmentation across the virtual disks, to thereby improve space utilization by the backup process.

12. The system of claim 11 wherein the data is organized as files, blocks, or objects on the storage system, and wherein the subjective relative characterization comprises high, low, moderate, and negligible fragmentation.

13. The system of claim 12 wherein the collected file system traces include at least one of the following: file metadata map, data I/O pattern, metadata data I/O pattern, cache effectiveness, slice distribution, and snapshot state.

14. The system of claim 13 wherein the file system comprises one of a Unix File System 64 (UFS64) and a Common Block File System (CBFS).

15. The system of claim 14 further comprising an I/O metadata repository storing the metadata traces, wherein the repository implements a Hadoop cluster system.

16. A computer program product comprising a non-transitory computer usable medium having machine readable code embodied therein for detecting a data organization issue in a storage system including a backup server computer coupled to storage devices and executing a backup process by:
collecting input/output (I/O) traces as dynamic traces for data transfers to and from the storage devices in a virtualized file system that creates virtual devices that emulate physical storage and presents data as files of a local virtual disk, for address locations that move due to virtualization that maps space between a back-end LUN (logical unit number) not presented to a host computer, and a front-end LUN that is presented to the host computer;
collecting file system traces as static traces for file and volume layout information of the data storage;
tracking, in a splitter component of the backup server computer, write operations captured in the dynamic traces to the storage devices organized into primary and recovery storage locations;
storing each write operation as a snapshot backup on the storage devices;
storing, by a metadata collector, metadata for each write operation in a metadata repository;
processing, by an analytics component, the dynamic and static traces to determine an effect of fragmentation for various workloads;
analyzing, in an analytics component processing the dynamic and static traces, both a static layout of the file system and layout conditions leading to fragmentation, by analyzing the metadata to determine an amount of address space fragmentation manifested as non-contiguous storage of file data by the backup process by calculating a fragmentation value through a formula combining factors comprising a sequentiality of addresses within the virtual file system for file system objects spread among the different virtual disks, a number of backend input/output (I/O) operations; cache efficiency of metadata and data caches, and performance of the storage devices, to detect data organization issues in the virtual file system using metadata analytics and operational parameters to identify one or more indicators of fragmentation;

applying a plurality of rules to calculate the fragmentation value on the basis of factors comprising a relative amount of address sequentiality, number of backend metadata operations, I/O density, randomness of I/O patterns, cache miss ratio, I/O operation disk spread, and fragmentation in the virtual file system and storage on flash memory;

expressing the calculated fragmentation value as one of a subjective relative characterization or a number that can be compared against a defined scale to facilitate determining if the amount of address space fragmentation presents a system performance issue; and suggesting remediation steps for a workload to reduce the amount of address space fragmentation across the virtual disks, to thereby improve space utilization by the backup process.

\* \* \* \* \*